US008006095B2

(12) United States Patent
Berenbaum et al.

(10) Patent No.: US 8,006,095 B2
(45) Date of Patent: Aug. 23, 2011

(54) CONFIGURABLE SIGNATURE FOR AUTHENTICATING DATA OR PROGRAM CODE

(75) Inventors: Alan D. Berenbaum, New York, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 819 days.

(21) Appl. No.: 11/848,854

(22) Filed: Aug. 31, 2007

(65) Prior Publication Data

US 2009/0063865 A1 Mar. 5, 2009

(51) Int. Cl.
*H04L 9/32* (2006.01)
(52) U.S. Cl. ............ 713/180; 713/2; 713/168; 713/169; 713/193; 711/152; 711/163
(58) Field of Classification Search .............. 713/2, 169, 713/180, 193, 156, 168; 711/152, 163
See application file for complete search history.

(56) References Cited

U.S. PATENT DOCUMENTS

| | | | | | |
|---|---|---|---|---|---|
| 5,442,704 | A | * | 8/1995 | Holtey | 711/163 |
| 5,931,853 | A | * | 8/1999 | McEwen et al. | 606/203 |
| 6,061,741 | A | * | 5/2000 | Murphy et al. | 709/248 |
| 6,134,597 | A | * | 10/2000 | Rieth et al. | 709/237 |
| 6,460,050 | B1 | | 10/2002 | Pace et al. | |
| 6,735,696 | B1 | * | 5/2004 | Hannah | 713/189 |
| 6,981,176 | B2 | * | 12/2005 | Fruehling et al. | 714/11 |
| 7,069,452 | B1 | * | 6/2006 | Hind et al. | 713/1 |
| 7,096,370 | B1 | * | 8/2006 | Klein | 713/193 |
| 7,139,890 | B2 | * | 11/2006 | Moran et al. | 711/163 |
| 7,712,131 | B1 | * | 5/2010 | Lethe | 726/20 |
| 2002/0009285 | A1 | * | 1/2002 | Safadi et al. | 386/46 |
| 2002/0166059 | A1 | * | 11/2002 | Rickey et al. | 713/200 |
| 2003/0210783 | A1 | * | 11/2003 | Filippi | 380/44 |
| 2004/0025010 | A1 | * | 2/2004 | Azema et al. | 713/156 |
| 2005/0076226 | A1 | * | 4/2005 | Boivie et al. | 713/187 |
| 2005/0228993 | A1 | * | 10/2005 | Silvester et al. | 713/168 |
| 2006/0112241 | A1 | * | 5/2006 | Weiss et al. | 711/154 |
| 2006/0129848 | A1 | * | 6/2006 | Paksoy et al. | 713/193 |
| 2006/0137015 | A1 | * | 6/2006 | Fahrny et al. | 726/26 |
| 2006/0272022 | A1 | * | 11/2006 | Loukianov et al. | 726/26 |
| 2006/0282899 | A1 | * | 12/2006 | Raciborski | 726/26 |
| 2007/0005992 | A1 | * | 1/2007 | Schluessler et al. | 713/193 |
| 2007/0006150 | A9 | * | 1/2007 | Walmsley | 717/120 |
| 2007/0226505 | A1 | * | 9/2007 | Brickell | 713/176 |
| 2008/0034264 | A1 | * | 2/2008 | Kaabouch et al. | 714/732 |
| 2008/0126810 | A1 | * | 5/2008 | Chiu | 713/186 |
| 2010/0275029 | A1 | * | 10/2010 | Little et al. | 713/176 |

* cited by examiner

*Primary Examiner* — Nabil M El Hady
(74) *Attorney, Agent, or Firm* — Meyertons Hood Kivlin Kowert & Goetzel, P.C.; Jeffrey C. Hood; Mark S. Williams (57) ABSTRACT

System and method for authenticating data or program code via a configurable signature. Configuration information is retrieved from a protected first memory, e.g., an on-chip register, where the configuration information specifies a plurality of non-contiguous memory locations that store the signature, e.g., in an on-chip memory trailer. The signature is retrieved from the plurality of non-contiguous memory locations based on the configuration information, where the signature is useable to verify security for a system. The signature corresponds to specified data and/or program code stored in a second memory, e.g., in off-chip ROM. The specified data and/or program code may be copied from the second memory to a third memory, and a signature for the specified data and/or program code calculated based on the configuration information. The calculated signature may be compared with the retrieved signature to verify the specified data and/or program code.

20 Claims, 4 Drawing Sheets

Figure 1

Figure 2 retrieve configuration information from a protected first memory, where the configuration information specifies a plurality of non-contiguous memory locations that store a checksum
302 retrieve the checksum from the plurality of non-contiguous memory locations of the checksum based on the configuration information, where the checksum is useable to verify security for a system
304

CONFIGURABLE SIGNATURE FOR AUTHENTICATING DATA OR PROGRAM CODE

BACKGROUND OF THE INVENTION

1. Field of the Invention

This invention relates generally to the field of computing devices, and more specifically to a configurable signature, e.g., for verifying data or program code, e.g., initialization code, in a computer system.

2. Description of the Related Art

Many hardware systems include a central processing unit (CPU), i.e., a main or host processor, and one or more embedded controllers for performing auxiliary functions for the system, such as initialization, input/output (I/O), management, and reset functionality. For example, an embedded controller may be part of a system-on-chip (SoC) that may also include various additional components that coupled to the embedded controller, e.g., memory, etc. Such systems may be vulnerable to unauthorized access or tampering by malicious users or agents, e.g., during boot-up.

It is important that initialization for the system be trustworthy; otherwise, an attacker could modify the code to perform unauthorized operations, e.g., to copy otherwise protected verification information, keys, passwords, etc., to some memory or I/O where it would be easily accessible. If the initialization code is contained in on-chip ROM, it cannot be modified and so it can be trusted by the chip manufacturer and the system vendor who purchases the chip. If, however, the code is loaded into on-chip RAM from an off-chip memory (for example, an SPI Flash memory chip), then the external memory is vulnerable to malicious interference. A memory image, e.g., of the initialization code, can be authenticated using digital signatures or MAC (Message Authentication Code). However, these methods are computationally intensive, and may be impractical for a low cost device. Thus, improved systems and methods for authenticating data or program code are desired.

Other corresponding issues related to the prior art will become apparent to one skilled in the art after comparing such prior art with embodiments of the present invention as described herein.

SUMMARY OF THE INVENTION

Various embodiments are presented of a system and method for authenticating data or program code in a system are presented. More specifically, a configurable signature may be used to authenticate data or code, e.g., to check or verify security in a system, e.g., a computer system that includes a main or host processor, and an embedded controller and memory. In one embodiment, the signature may be useable by the embedded controller to verify initialization code for the system, e.g., prior to boot-up of the main processor, although in other embodiments, the configurable signature may be used to verify data and/or program code in any type of system as desired.

First, configuration information may be retrieved from a protected first memory, where the configuration information specifies a plurality of non-contiguous memory locations that store a signature. In some embodiments, the protected first memory may be or include at least one register, e.g., one or more on-chip configuration registers. For example, in one embodiment, the embedded controller and protected first memory, e.g., the one or more configuration registers, may be included on a system-on-chip, e.g., SoC, along with on-chip memory. The SoC may itself be included in a system, e.g., a computer system, as mentioned above.

The signature may be retrieved from the plurality of non-contiguous memory locations of the signature based on the configuration information, where the signature is useable to verify security for a system. The signature may correspond to specified data and/or program code stored in a second memory, e.g., external memory, e.g., off-chip memory, such as flash memory. For example, the specified data and/or program code may include initialization code for the system which must be loaded into on-chip memory before execution. Note that this loading of the data and/or program code, e.g., initialization code, from external (e.g., off-chip) memory introduces a risk of tampering, since a malicious agent might interfere with the transfer, e.g., by replacing the external memory, by intercepting the data and/or program code and modifying or replacing it, and so forth. Thus, the signature may be used to verify the loaded data and/or program code, i.e., to ensure that the data and/or program code has not been tampered with.

In some embodiments, the method may further include copying the specified data and/or program code from the second memory to a third memory, e.g., from the external memory to on-chip memory, e.g., a random access memory (RAM) located on the chip. A signature for the specified data and/or program code may be calculated based on the configuration information, and the calculated signature compared with the retrieved signature to verify the specified data and/or program code. For example, the configuration information may, in addition to the plurality of non-contiguous memory locations, may include one or more parameters for the signature, and so calculating a signature for the specified data and/or program code based on the configuration information may include calculating the signature using the one or more parameters for the signature. For example, this portion of the configuration information may be stored in another register on the embedded controller, e.g., on the SoC that includes the embedded processor. Note that the one or more configuration registers may or may not be contiguous, i.e., the register(s) or memory storing the plurality of non-contiguous memory locations or signature addresses may be distinct from the configuration register(s) or memory storing the signature parameters.

Note that this "byte scrambling" (distributing the configuration information in noncontiguous memory locations) makes the task of reverse engineering the signature much more difficult. For example, if a malicious agent knew that the signature were a 4-byte CRC, he or it could use a valid SPI Flash ROM to determine the CRC coefficients by trying all possible polynomials over the initialization code (approximately 2 billion). However, by hiding the CRC in a 64 byte field, the agent must try 64!/60!, or approximately 16 million, permutations of the trailer (note that this does not include the 2 billion combinations of each respective 4 byte sequence). Note that the above-described CRC is meant to be exemplary only, and that any other type of signature or signature formula or specification may be used as desired, e.g., different CRCs, hashes, checksums, and so forth.

Regarding to the use of on-chip configuration registers to store signature parameters, in some embodiments, one type of signature may be used for all instances of a chip, but the parameters used in calculating the signature may be varied for each variation of the chip (for example, for different customers, or for different products designed by one customer). As discussed above, the signature parameters, as well as the location of the signature, may stored in on-chip registers that have restricted access, i.e., that are protected. For example, in preferred embodiments, the registers cannot be read by automatic test equipment (ATE) or scan modes, but only by the embedded controller when the embedded controller is executing from boot ROM code. If the boot ROM is inaccessible, as for example, via a read-protect bit scheme, described below, the signature parameters are unreadable.

As mentioned above, in preferred embodiments, the first memory, the embedded controller, and the third memory are include in a system-on-chip (SoC) in the system. Note that in some embodiments, the efficacy of the security techniques disclosed herein relies on the fact that the configuration information and the (copied) data and/or program code (e.g., initialization code) are stored locally to the embedded controller, as opposed to being stored in off-chip memory.

Thus, in one embodiment, the embedded controller may copy the external memory into the on-chip RAM (i.e., the third memory), calculating the signature, e.g., the hash function, along the way, e.g., using a ROM-based boot loader. As discussed above, in some embodiments, the above copying, calculating, and comparing may be performed by the embedded controller prior to boot-up of the main processor. In other words, prior to booting the main processor, the data and/or program code, e.g., initialization code for the system, may be verified via the signature, thus ensuring that the initialization process will proceed as intended, e.g., without security violations, i.e., ensuring that the initialization code has not been corrupted or otherwise tampered with. Of course, in other embodiments, the configurable signature may be used to protect or verify any data or program code as desired.

Thus, various embodiments of the invention described herein may facilitate protection of data or program code in a system.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 11/848,808 titled "Memory Protection For Embedded Controllers," filed Aug. 31, 2007.

Various embodiments of a system and method are presented for authenticating data or program code, e.g., for securing data or program instructions in a system, e.g., a computer system.

Note that any headings used are for organizational purposes only and are not meant to be used to limit or interpret the description or claims. Furthermore, it should be noted that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

Moreover, as used herein, a "set of instructions" may refer to one or more instructions. More specifically, in some embodiments, "instructions" may refer to programming code, software, and/or functions implemented in the form of a code that is executable by a controller, microprocessor, and/or custom logic circuit adapted to execute these instructions. In some embodiments, these instructions may comprise device drivers, control software, and/or machine code.

As used herein, a "controller" refers to any type of processor, such as a central processing unit (CPU), microprocessor, microcontroller, or embedded controller or microcontroller, among others.

Overview

Various embodiments of the invention described herein may provide protection of data and/or program instructions used to maintain or verify system security.

Figure 1:
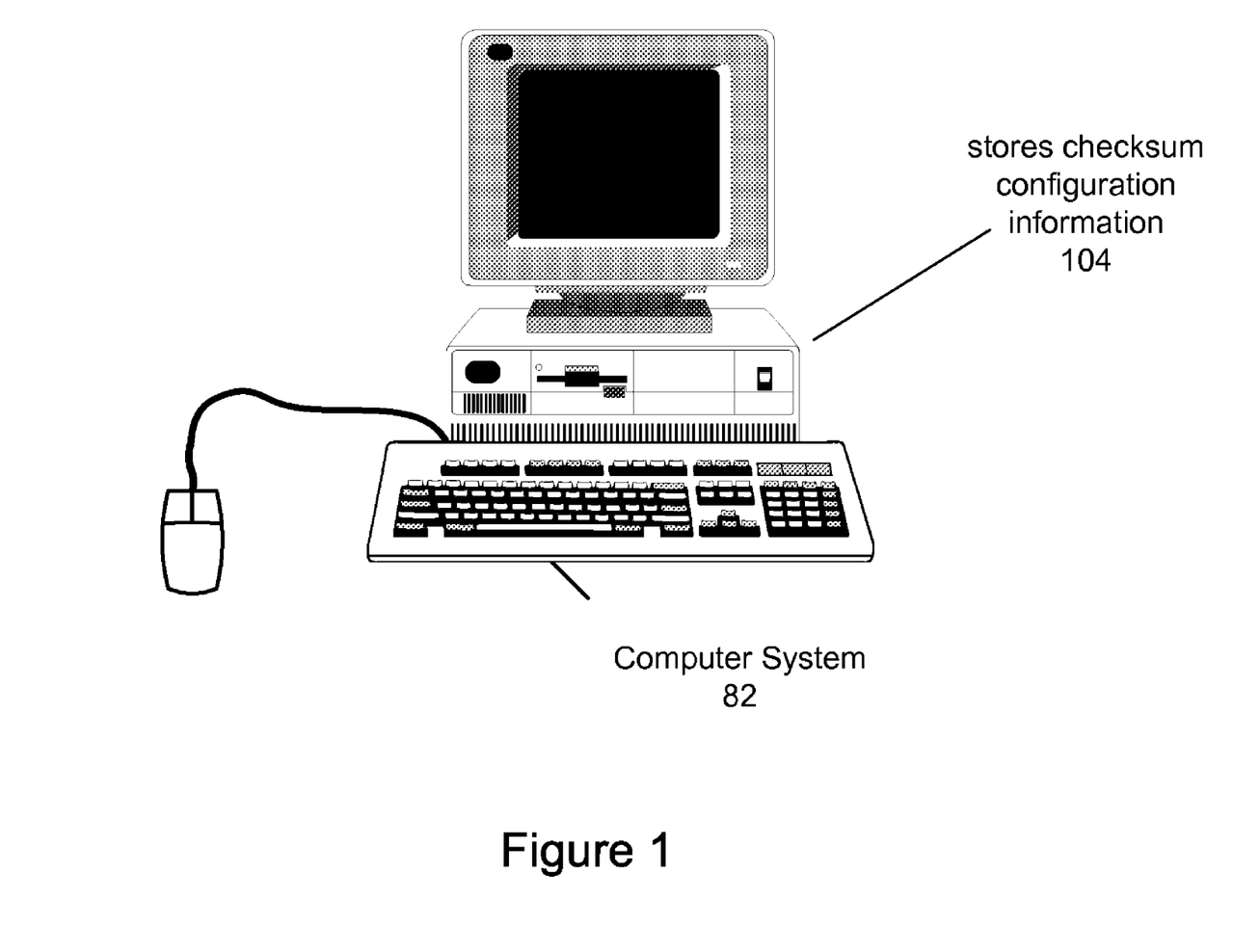
FIG. 1 is a high-level block diagram of an exemplary computer system configured to implement one embodiment of the present invention.

FIG. 1—Exemplary Computer System

FIG. 1 is a high-level block diagram of an exemplary computer system 82 configured to implement one embodiment of the present invention, specifically to authenticate data or program code via a configurable signature. The system of FIG. 1 comprises a computer system, e.g., a personal computer (PC), although in other embodiments, the techniques and systems described herein may be implemented in any other systems as desired.

As FIG. 1 shows, the computer system 82 stores signature configuration information 104, according to embodiments of the present invention. In some embodiments, the computer system 82 includes a main or central processor, i.e., a host processor, as well as at least one embedded controller, e.g., a microcontroller, e.g., included in a system-on-chip (SoC), such as, for example, a keyboard controller for managing or controlling communications between a keyboard and the main processor. A memory may be included on the SoC with the embedded controller, and in various embodiments, may be a random access memory (RAM) that stores initialization code for the system. The embedded controller may load the initialization code into the memory (e.g., the RAM) from an external memory, e.g., an off-chip memory, e.g., an SPI flash memory chip, via a ROM-based boot loader, e.g., boot ROM code, and so the system may need to verify the memory contents to ensure that the initialization code has not been tampered with. Thus, a signature may be computed and used in accordance with the stored signature configuration information to verify the contents of the memory, e.g., the initialization code, as will be described in more detail below.

Figure 2:
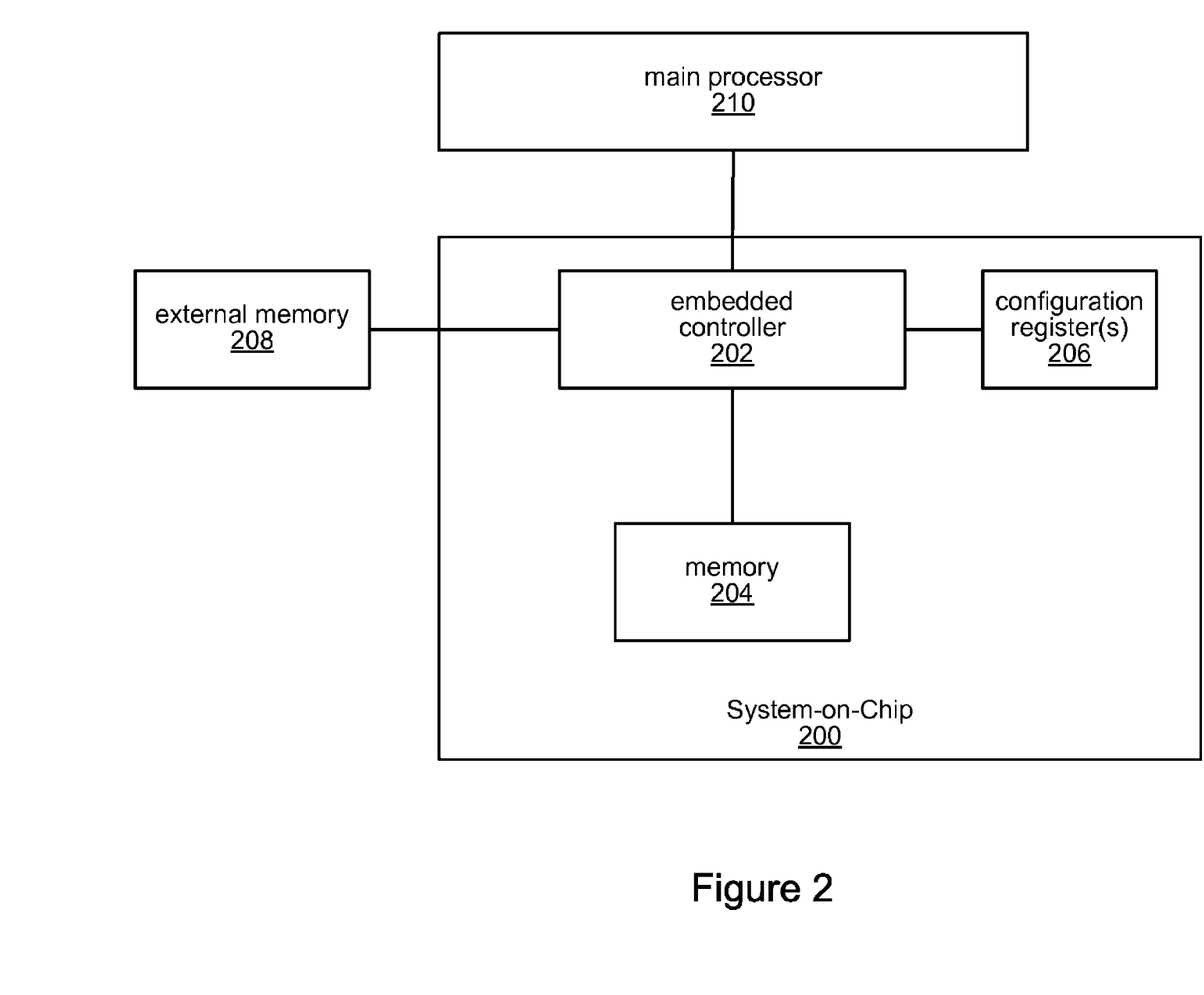
FIG. 2 is an exemplary high-level system block diagram, according to one embodiment of the present invention.

FIG. 2—High-Level Block Diagram of Exemplary System

FIG. 2 is a high-level block diagram of an exemplary system, according to one embodiment. More specifically, FIG. 2 illustrates primary components of an exemplary system implementing embodiments of the present invention.

As FIG. 2 shows, the system may include an embedded controller 202, coupled to at least one register (or other memory) 206 that stores configuration information for the signature. As FIG. 2 indicates, in some embodiments, the embedded controller 202 may be included in a system-on-chip (SoC) 200. The embedded controller 202 may also be coupled to a memory 204, e.g., on-chip memory, for storing data and/or program code, e.g., initialization code, for initializing the system, where the signature, which is retrievable using configuration information stored in the configuration register(s) 206, corresponds to the data and/or program code. The embedded controller 202 may also be coupled to a main or central processor, e.g., a central processing unit (CPU), which may be referred to as the host CPU or processor, as well as external (i.e., off-chip) memory 208, that may store the data and/or program code, e.g., initialization code, and from which the controller 202 may copy the data and/or program code into the on-chip memory 204, e.g., via a ROM bootloader, as will be described below in more detail.

In some embodiments, the controller 202 may comprise a peripheral device controller for a computer system. For example, in one exemplary embodiment, the embedded controller 202 may be a keyboard controller comprised in a computer system, e.g., the computer system of FIG. 1, although in other embodiments, the system may be any type of system as desired.

Figure 3:
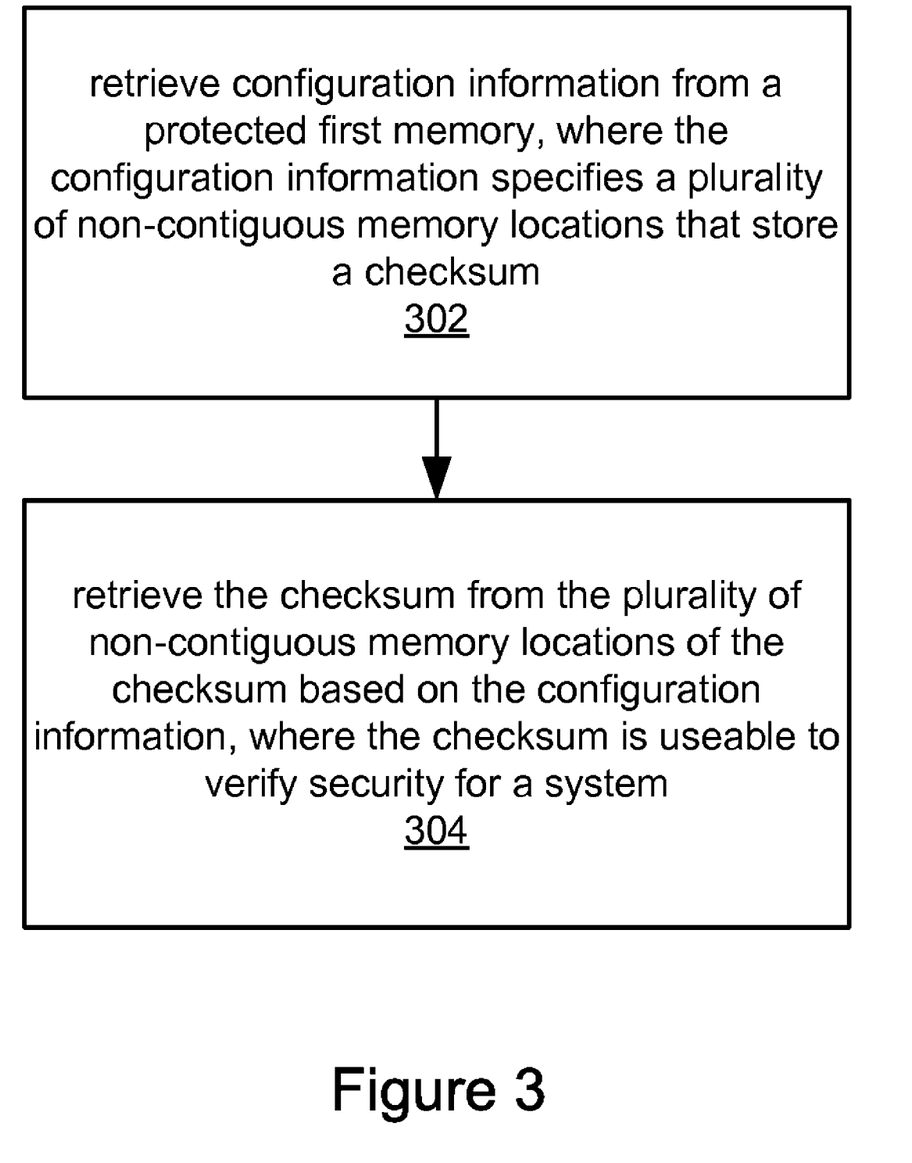
FIG. 3 is a flowchart of a method for authenticating data or program code, according to one embodiment.

FIG. 3—Method for Authenticating Data or Program Code

FIG. 3 is a high-level flowchart of a method for authenticating data or program code using a configurable signature, e.g., to verify a system, e.g., a computer system that includes a main or host processor, and an embedded controller and memory. In one embodiment, the signature may be useable by the embedded controller to verify initialization code for the system, e.g., prior to boot-up of the main processor, although in other embodiments, the configurable signature may be used to verify data and/or program code in any type of system as desired. In various embodiments, some of the method elements shown may be performed concurrently, in a different order than shown, or may be omitted. Additional method elements may also be performed as desired. As shown, this method may operate as follows.

In 302, configuration information may be retrieved from a protected first memory, where the configuration information specifies a plurality of non-contiguous memory locations that store a signature. As noted above with reference to FIG. 2, in some embodiments, the protected first memory may be or include at least one register, e.g., one or more on-chip configuration registers 206. For example, as described above, the embedded controller and protected first memory, e.g., the at least one configuration register 206, may be included on a system-on-chip, e.g., SoC 200, along with on-chip memory 204. The SoC may itself be included in a system, e.g., a computer system, such as the computer system 82 of FIG. 1.

In 304, the signature may be retrieved from the plurality of non-contiguous memory locations of the signature based on the configuration information, where the signature is useable to verify security for a system. The signature may correspond to specified data and/or program code stored in a second memory, e.g., external memory 208, e.g., off-chip memory, such as flash memory. For example, the specified data and/or program code may include initialization code for the system which must be loaded into on-chip memory before execution. Note that this loading of the data and/or program code, e.g., initialization code, from external (e.g., off-chip) memory introduces a risk of tampering, since a malicious agent might interfere with the transfer, e.g., by replacing the external memory, by intercepting the data and/or program code and modifying or replacing it, and so forth. Thus, the signature may be used to verify the loaded data and/or program code, i.e., to ensure that the data and/or program code has not been tampered with.

In some embodiments, the method may further include copying the specified data and/or program code from the second memory to a third memory, e.g., from the external memory 208 to on-chip memory 204, e.g., a random access memory (RAM) located on the chip. A signature for the specified data and/or program code may be calculated based on the configuration information, and the calculated signature compared with the retrieved signature to verify the specified data and/or program code. For example, the configuration information may, in addition to the plurality of non-contiguous memory locations, may include one or more parameters for the signature, and so calculating a signature for the specified data and/or program code based on the configuration information may include calculating the signature using the one or more parameters for the signature. For example, this portion of the configuration information may be stored in another register on the embedded controller, e.g., on the SoC that includes the embedded processor. Note that the one or more configuration registers may or may not be contiguous, i.e., the register(s) or memory storing the plurality of non-contiguous memory locations or signature addresses may be distinct from the configuration register(s) or memory storing the signature parameters.

In some embodiments, the signature may be made more difficult to guess (e.g., by a malicious agent reverse engineering an authorized SPI Flash device) through any of a number of methods.

For example, as noted above, in one embodiment, the signature includes or is a multi-byte value distributed over the plurality of non-contiguous memory locations, where the configuration information specifies the location and order of each byte of the value. In some embodiments, these non-contiguous memory locations may be included in a trailer, e.g., where the trailer is included in the third memory, and where, in addition to the plurality of non-contiguous memory locations storing the signature, the trailer includes random values. In other words, the signature may be embedded in a long trailer, of which most of the bytes are filled with noise (that is, with random 1's and 0's).

As one example, the signature could be a 4-byte cyclic redundancy check (CRC) and the initialization code trailer could be 64 bytes long. Sixty of the bytes would be filled with a random pattern of 1's and 0's. The boot ROM code may then determine which 4 of the 64 bytes constitute the CRC with 3 secret bytes described in the signature configuration register section, where the 3 bytes contain 4 6-bit fields. Each field may contain the address of one byte of the CRC, so that the 4 bytes of the CRC can occupy any 4 bytes of the 64 byte trailer, in any order.

Figure 4:
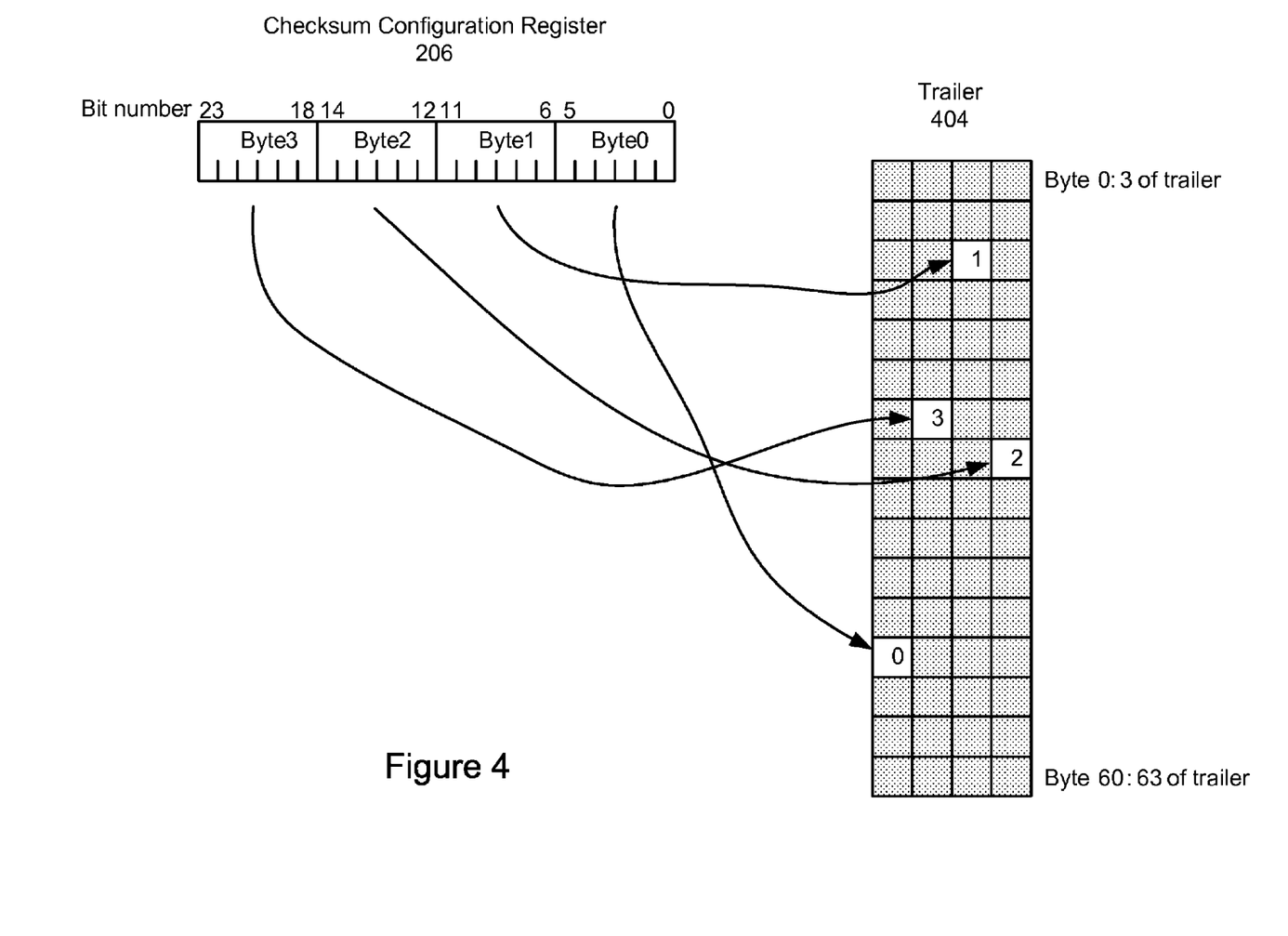
FIG. 4 illustrates a distributed signature, according to one embodiment of the present invention.

FIG. 4 illustrates one embodiment of a signature configuration register that stores addresses of the non-contiguous memory locations storing the signature. More specifically, FIG. 4 illustrates how a signature configuration register may be used to identify the signature held within a larger trailer. The example of FIG. 4 assumes a 4-byte signature, in this case, a CRC, held in a 64-byte trailer, and that the least-significant byte has the lowest byte address.

As may be seen, reading from left to right, i.e., from least significant bit to most significant bit, the 4 bytes of the register each denote respective memory locations in the trailer wherein are stored respective portions of the signature, and whereby the signature portions may be retrieved. Note that since this address information is in protected memory, a malicious agent has no way of knowing which bytes of the trailer store the signature, nor in which order the signature portions should be assembled or sequenced.

In one exemplary embodiment, the CRC may be specified by a plurality of coefficients, e.g., of a CRC polynomial, where the CRC includes one bit per coefficient. Thus, for a 32 bit (4 byte) CRC, there are 32 coefficients. Thus, the protected first memory, e.g., the configuration register or registers, may include a portion 32 bits or 4 bytes in size for storing these coefficients. On example of a 32 bit CRC polynomial is:

$$a_{31} \times x^{31} + a_{30} \times x^{30} + a_{29} \times x^{29} + \ldots + a_0 \times x^0, \quad (1)$$

where the 32 bits stored in the signature configuration register are $a_{31}$ through $a_0$. In this example, the terms of the CRC polynomial are included in the calculation of the signature only if the corresponding $a_i$ bit in the configuration register is 1.

Note that this "byte scrambling" makes the task of reverse engineering the signature much more difficult. For example, if a malicious agent knew that the signature were a 4-byte CRC, he or it could use a valid SPI Flash ROM to determine the CRC coefficients by trying all possible polynomials over the initialization code (approximately 2 billion). However, by hiding the CRC in a 64 byte field, the agent must try 64!/60!, or approximately 16 million, permutations of the trailer (note that this does not include the 2 billion combinations of each respective 4 byte sequence).

Note that while the exemplary signature of FIG. 4 is a 32-bit CRC, other signatures may be implemented as desired, as long as the definition of the signature algorithm requires a sufficiently large number of bits so that guessing the parameters is difficult. For example, simply increasing the signature (e.g., the CRC) from 32 bits to 48 bits or 64 bits may make brute force attacks intractable, at the expense of a more complex boot sequence. Similarly, the trailer may be increased form 64 bytes to 128 bytes, for a three order of magnitude greater number of permutations, at the expense of space in the SPI Flash. Thus, various relatively straightforward techniques may be used to greatly increase the effort required to crack the signature for the system. Note that the above-described CRC is meant to be exemplary only, and that any other type of signature or signature formula or specification may be used as desired, e.g., different CRCs, hashes, checksums, and so forth.

Regarding to the use of on-chip configuration registers to store signature parameters, in some embodiments, one type of signature may be used for all instances of a chip, but the parameters used in calculating the signature may be varied for each variation of the chip (for example, for different customers, or for different products designed by one customer). As discussed above, the signature parameters, as well as the location of the signature, may stored in on-chip registers that have restricted access, i.e., that are protected. For example, in preferred embodiments, the registers cannot be read by automatic test equipment (ATE) or scan modes, but only by the embedded controller when the embedded controller is executing from boot ROM code. If the boot ROM is inaccessible, as for example, via a read-protect bit scheme, described below, the signature parameters are unreadable.

As mentioned above, in preferred embodiments, the first memory, the embedded controller, and the third memory are include in a system-on-chip (SoC) in the system. Note that in some embodiments, the efficacy of the security techniques disclosed herein relies on the fact that the configuration information and the (copied) data and/or program code (e.g., initialization code) are stored locally to the embedded controller, as opposed to being stored in off-chip memory.

Thus, in one embodiment, the embedded controller may copy the external memory into the on-chip RAM (i.e., the third memory), calculating the signature, e.g., the hash function, along the way, e.g., using a ROM-based boot loader. As discussed above, in some embodiments, the above copying, calculating, and comparing may be performed by the embedded controller prior to boot-up of the main processor. In other words, prior to booting the main processor, the data and/or program code, e.g., initialization code for the system, may be verified via the signature, thus ensuring that the boot process will proceed as intended, e.g., without security violations, i.e., ensuring that the initialization code has not been corrupted or otherwise tampered with. Of course, in other embodiments, the configurable signature may be used to protect or verify any data or program code as desired.

Thus, various embodiments of the invention described herein may be used to verify the integrity of data and/or program instructions.

We claim:

1. A method, comprising:
   retrieving configuration information from a protected first memory, wherein the configuration information specifies a plurality of non-contiguous memory locations, wherein the plurality of non-contiguous memory locations store one or more parameters for a signature formula;
   retrieving the one or more parameters for the signature formula from the plurality of non-contiguous memory locations based on the configuration information; and
   calculating a first signature formula;
   wherein the first signature is useable to verify security for a system.

2. The method of claim 1, wherein the first signature corresponds to specified data and/or program code stored in a second memory, and wherein the method further comprises:
   copying the specified data and/or program code from the second memory to a third memory;
   retrieving a second signature wherein said calculating the first signature comprises calculating the first signature for the specified data and/or program code using the signature formula; and
   comparing the calculated first signature with the retrieved second signature to verify the specified data and/or program code.

3. The method of claim 2, wherein the specified data and/or program code comprises initialization code for the system.

4. The method of claim 2, wherein the system comprises a main processor and an embedded controller, and wherein said copying, said calculating, and said comparing are performed by the embedded controller prior to boot-up of the main processor.

5. The method of claim 2, wherein the configuration information further comprises the one or more parameters for the signature formula.

6. The method of claim 2, wherein the first signature comprises one or more of:
   a cyclic redundancy check (CRC);
   a checksum; or
   a hash.

7. The method of claim 2,
   wherein the protected first memory comprises a register on a chip in the system;
   wherein the second memory comprises an external memory located off-chip; and
   wherein the third memory comprises a random access memory (RAM) on the chip.

8. The method of claim 2, wherein the signature formula comprises multi-byte data distributed over the plurality of non-contiguous memory locations in a trailer, and wherein the configuration information specifies the location and order of each byte of the data.

9. The method of claim 8, wherein the trailer is comprised in the third memory, and wherein, in addition to the plurality of non-contiguous memory locations storing the signature formula, the trailer comprises random values.

10. The method of claim 2, wherein the first memory, the embedded controller, and the third memory are comprised in a system-on-chip (SoC) in the system.

11. A system for authenticating data or program code, comprising:
   an embedded processor; and
   a protected first memory coupled to the embedded processor, wherein the protected first memory stores configuration information specifying a plurality of non-contiguous memory locations that store one or more parameters for a signature formula;
   wherein the embedded processor is operable to retrieve the one or more parameters for the signature formula from the plurality of non-contiguous memory locations based on the configuration information and to calculate a first signature using the signature formula, wherein the signature is useable to verify security for a system.

12. The system of claim 11, further comprising:
   a second memory coupled to the embedded processor, wherein the second memory stores data and/or program code, and wherein the first signature corresponds to the data and/or program code stored in the second memory; and
   a third memory coupled to the embedded processor, wherein the embedded processor is further operable to:
      copy the data and/or program code from the second memory to the third memory;
      retrieve a second signature
      wherein said calculating the first signature comprises calculating the first signature for the data and/or program code using the signature formula; and
      compare the calculated first signature with the retrieved second signature to verify the data and/or program code.

13. The system of claim 12, wherein the data and/or program code comprises initialization code for the system.

14. The system of claim 12, further comprising:
   a main processor, coupled to the embedded processor;
   wherein the embedded processor is operable to perform said copying, said calculating, and said comparing prior to boot-up of the main processor.

15. The system of claim 12, wherein the configuration information further comprises the one or more parameters for the signature formula.

16. The system of claim 12, wherein the signature comprises one or more of:
   a cyclic redundancy check (CRC);
   a checksum; or
   a hash.

17. The system of claim 12,
   wherein the protected first memory comprises a register on a chip in the system;
   wherein the second memory comprises an external memory located off-chip; and
   wherein the third memory comprises a random access memory (RAM) on the chip.

18. The system of claim 12, wherein the signature formula comprises multi-byte data distributed over the plurality of non-contiguous memory locations in a trailer, and wherein the configuration information specifies the location and order of each byte of the data.

19. The system of claim 18, wherein the trailer is comprised in the third memory, and wherein, in addition to the plurality of non-contiguous memory locations storing the signature formula, the trailer comprises random values.

20. The system of claim 12, wherein the first memory, the embedded controller, and the third memory are comprised in a system-on-chip (SoC) in the system.

\* \* \* \* \*

UNITED STATES PATENT AND TRADEMARK OFFICE
CERTIFICATE OF CORRECTION

| | | |
|---|---|---|
| PATENT NO. | : 8,006,095 B2 | Page 1 of 1 |
| APPLICATION NO. | : 11/848854 | |
| DATED | : August 23, 2011 | |
| INVENTOR(S) | : Berenbaum et al. | |

It is certified that error appears in the above-identified patent and that said Letters Patent is hereby corrected as shown below:

Column 8
Line 31, please delete "calculating a first signature formula;" and substitute
--calculating a first signature using the signature formula;--.

Column 9
Line 37, please delete "retrieve a second signature" and substitute
--retrieve a second signature;--.

Signed and Sealed this
Eighth Day of November, 2011

David J. Kappos
*Director of the United States Patent and Trademark Office*